United States Patent [19]

Gustavsen

[11] Patent Number: 4,726,867

[45] Date of Patent: Feb. 23, 1988

[54] CARPET SEAMING SUPPORT AND METHOD

[76] Inventor: Willard Gustavsen, P.O. Box 37, Berrien Springs, Mich. 49103

[21] Appl. No.: 38,389

[22] Filed: Apr. 15, 1987

[51] Int. Cl.$^4$ .......................... B29C 65/18; B32B 31/20
[52] U.S. Cl. .................... 156/304.4; 156/304.7; 156/505; 156/545; 156/304.6
[58] Field of Search .................. 156/71, 289, 304.4, 156/304.6, 304.7, 505, 506, 537, 545, 574

[56] References Cited

U.S. PATENT DOCUMENTS

| | | | |
|---|---|---|---|
| 3,660,191 | 5/1972 | Shimota | 156/152 |
| 3,816,203 | 6/1974 | Bascom | 156/304.6 |
| 4,438,323 | 3/1984 | Milnes | 156/304.7 |
| 4,536,244 | 8/1985 | Greci | 156/304.6 |
| 4,584,040 | 4/1986 | Anderson | 156/304.6 |

*Primary Examiner*—Jerome Massie
*Assistant Examiner*—J. Davis
*Attorney, Agent, or Firm*—Cullen, Sloman, Cantor, Grauer, Scott & Rutherford

[57] ABSTRACT

A hot melt carpet seaming support which includes a plurality of flat generally rectangular slats, wherein the mid portion slats are slidable on a flexible wire or filament into abutting relation forming a flat continuous support for the heat bonding carpet tape beneath the opposed edges of the carpet sections to be joined. The carpet seaming support thus provides a firm support during bonding which avoids heat damage to the carpet pad. Further, the carpet seaming support is flexible about the wire or filament for easy removal of the seaming support particularly at the wall and coiling for storage. The method includes arranging the slats in abutting side-to-side relation beneath the carpet sections to be joined for receipt of the bonding tape and removal of the seaming support following bonding, as defined.

3 Claims, 7 Drawing Figures

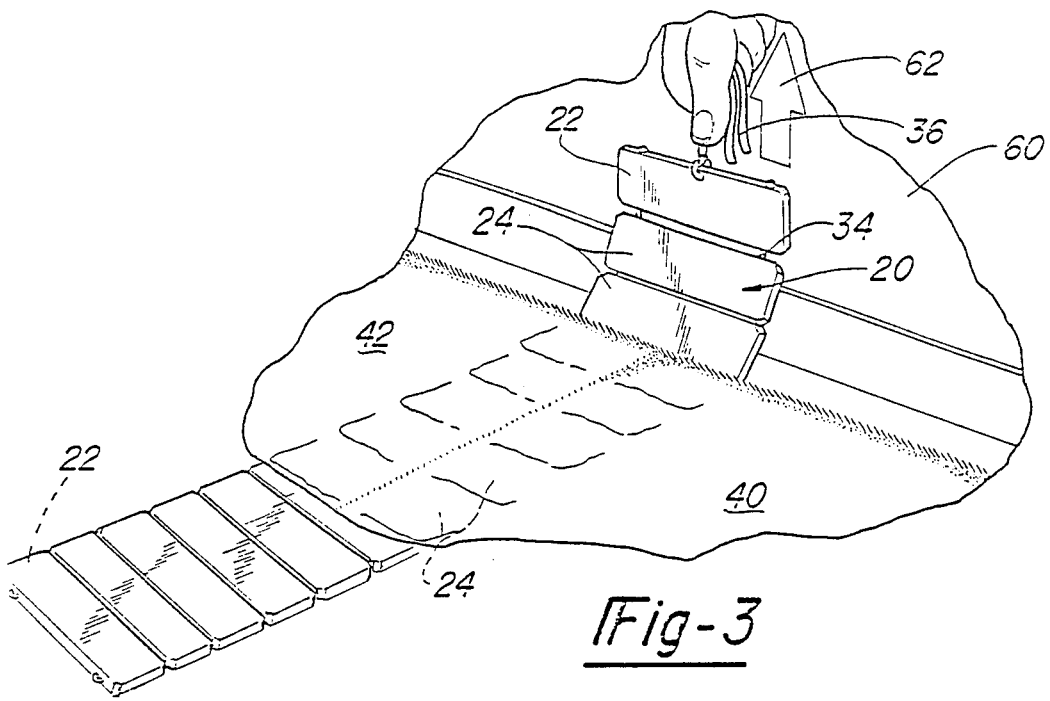
Fig-3
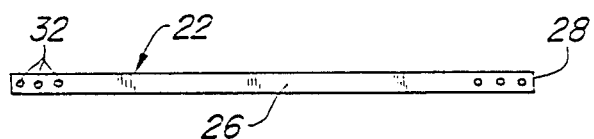
Fig-4
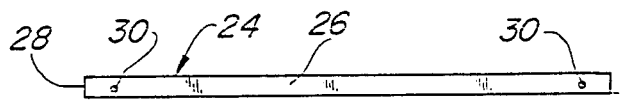
Fig-5
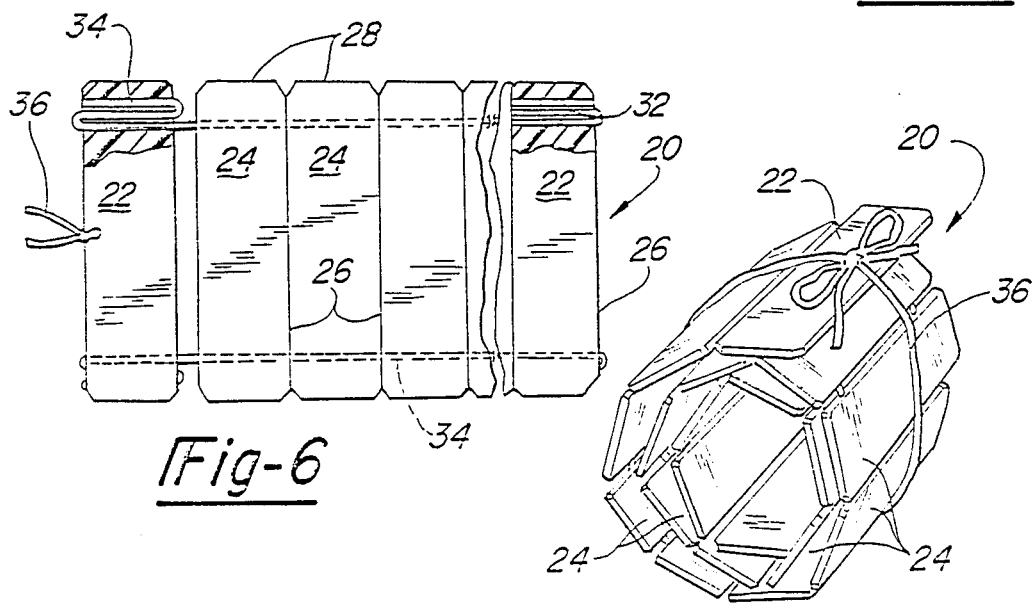
Fig-6
Fig-7

CARPET SEAMING SUPPORT AND METHOD

FIELD AND BACKGROUND OF THE INVENTION

In many interior and exterior carpet installations, carpet sections must be joined by bonding the edges of the carpet sections to form a continuous carpet having the dimensions of the room. The joining of carpet sections is generally accomplished by using a bonding tape having a thermoplastic adhesive. The carpet sections to be joined are arranged with the edges to be joined in parallel abutting relation. The bonding tape is then positioned beneath and between the opposed edges of the carpet sections in parallel relation to the seam. The bonding tape is then heated by applying a heated hot melt carpet seaming iron over the tape, heating and softening the thermoplastic adhesive. Pressure is then applied to the carpet portions adjacent the carpet edges, bonding the carpet sections to the heat bonding tape and forming a substantially continuous carpet.

There are several problems with this method of hot melt carpet seaming. First, a carpet is normally laid over a carpet pad which may be relatively soft or flexible. Polymer foam carpet pads are now in common use which include a polymer "skin" on the top surface to prevent pentration of water and other fluids. When the hot seaming iron is applied to the seaming tape, the heat is often sufficient to melt the polymer skin of the carpet pad, removing the waterproof feature of the pad or otherwise damaging the pad. Further, it is very difficult to form a good seam between the carpet sections where the opposed edges are in abutting relation to form a seam which is substantially invisible. This is because the carpet edges will spread when downward pressure is applied to the carpet edges because of the relatively soft or resilient carpet pad. Finally, carpet seaming is a time consuming task, particularly where a good seam is formed. Today, the majority of carpet sales are made through carpet sales companies which normally subcontract the installation of the carpet. The carpet sales companies generally include a warranty with the sale which covers both the carpet and the installation. The carpet installers generally work on a fixed rate or piece basis and therefore the time necessary to seam the carpet is very important to the installers and the quality of the seam is very important to the carpet sales company. It should also be noted that certain types of carpet are very difficult to seam, such as Berber-type carpeting which is a closely napped or woven carpet, generally having a wool nap.

These problems are at least partially solved by using one of the following techniques. First, carpet installers often use a hand-made wooden carpet seam support which comprises a relatively thin board, such as Masonite, having a width of four or five inches and a length of three or four feet. As will be understood, however, a rigid seaming board cannot be used adjacent a wall because the board must be removed after seaming. The thermoplastic adhesive is difficult to clean from a wood seaming board and it is difficult to slide the seaming board out from under the carpet. Finally, a wood seaming board will catch or hang up on the tackless strip pins. Very recently, an aluminum seaming board has become available, however, the rigid aluminum seaming board cannot be used where the seam extends to a vertical wall and the aluminum seaming board conducts the heat of the iron to the pad, scorching or melting the skin surface of the pad. A more common method of seaming carpet sections involves seaming the carpet sections in a larger room, preferably on wood or hard flooring. The bonded carpet sections are then rolled and carried into the room where the carpet is to be laid. Where the carpet sections are joined in the room where the carpet is to be installed, it is also recommended to lift the carpet, following seaming, to check for inadvertent bonding of the carpet tape to the carpet pad and remove any sections of the tape which were inadvertently bonded to the pad. This, of course, also results in damage to the pad and loss of waterproofing, as described above.

The "flexible" carpet seaming support and method of this invention solves the problems of the prior art in a very simple manner and avoids damage to the carpet pad. Further, the carpet sections may be seamed in place, including seams which extend to a vertical wall surface, as now described.

SUMMARY OF THE INVENTION

The hot melt carpet seaming support of this invention solves the problems of the prior art associated with seaming carpet sections by providing a flat continuous carpet bonding tape supporting surface during bonding of the carpet edges and which becomes flexible for removal of the seaming support following installation, thus permitting use of the seaming support even at a vertical wall surface. The carpet seaming support includes a plurality of flat generally rectangular slats with each slat having opposed side surface and the slats arranged in generally side-to-side relation. The slats located at the mid portion of the carpet seaming support are preferably slidably interconnected by a flexible filament, such as braided wire, and the wire is attached to the end members, which can be end slats identical to the mid portion slats. In the most preferred embodiment, the slats each include at least two spaced apertures which extend through the side edges of the slats and wires are received through the apertures and attached to the end slats, retaining the slats in side-to-side relation. During installation, the mid portion slats are arranged on the wires or filaments in abutting relation forming a flat continuous support for the carpet tape and the opposed carpet edges. In the most preferred embodiment, the mid portion slats may be spaced from one end slat so that the carpet tape is received over the mid portion slats and beneath the end slat during bonding. Following bonding, the seaming support may be coiled or bent about the flexible filament or wires to remove the seaming support from beneath the bonded carpet sections without damaging the bond even at a vertical wall. The end slat preferably includes a drawstring to assist in removal of the seaming support.

The method of this invention then includes the following steps. First, the carpet sections to be joined are arranged with the edges to be bonded in parallel abutting relation. As set forth above, the carpet sections may be joined with the method and carpet seaming support of this invention in place. That is, the carpet sections may be placed in the final location on the carpet pad.

The carpet seaming support is then located below and between the carpet edges to be joined. As decribed above, the carpet seaming support includes a plurality of flat preferably rectangular slats slidably connected on a flexible filament. The method then includes arranging the slats in side-to-side abutting relation to form a flat continuous supporting surface between the carpet sections to be joined. A heat bonding tape is then located over the carpet seaming support. The tape includes side portions which extend beneath the carpet sections to be joined and the tape is coated with a thermoplastic adhesive. Heat is then applied to the heat bonding tape, heating and softening the thermoplastic adhesive to the bonding temperature of the adhesive. As described, the tape may be heated by applying a conventional hot melt carpet seaming iron.

Following heating, pressure is applied to the carpet portions adjacent the opposed carpet edges, bonding the carpet portion and edges to the heat bonding tape. The carpet seaming support of this invention provides a firm support for bonding the carpet to the carpet tape, preventing spreading of the carpet edges as pressure is applied and heat damage to the carpet pad.

Finally, the carpet seaming support of this invention may be easily removed by pulling on the end slat even at a vertical wall. The carpet seaming support is flexible about the wires or filament, permitting removal of the seaming support and coiling for storage.

The carpet seaming support and method of this invention therefore solves the problems of the prior art by providing a firm continuous support for the carpet tape which avoids spreading of the edges to be joined and which absorbs heat, thereby avoiding damage to the carpet pad. Further, the carpet seaming support may be used to form a carpet seam which extends to a vertical wall or other obstruction because the carpet seaming support is flexible for easy removal. In the most preferred embodiment, the slats are formed of a heat absorbant material, which avoids damage to the carpet pad, and the slats are preferably formed of a material having a relatively low coefficient of friction, making it easier to remove the slats from beneath the carpet and clean any adhesive adhering to the slats. The carpet seaming support and method of this invention therefore solves the problems of the prior art in a relatively simple manner. Other advantages and meritorious features of the carpet seaming support and method of this invention will be more fully understood from the following detailed description of the preferred embodiments and method, the appended claims and the drawings, a brief description of which follows.

BRIEF DESCRIPTION OF THE DRAWINGS

FIG. 3 illustrates the final step in the method of this invention, wherein the carpet seaming support is removed from the seamed carpet;

FIG. 4 is a side view of one embodiment of an end slat illustrating the apertures which receive the filaments;

FIG. 5 is a side view of a slat in the mid portion of the carpet seaming support illustrated in FIGS. 1 to 4;

FIG. 6 is a partial fragmented top view of the embodiment of the carpet seaming support illustrated in FIGS. 1 to 5; and FIG. 7 is a top elevation of the embodiment of the carpet seaming support illustrated in FIGS. 1 to 6 which has been coiled for storage.

DESCRIPTION OF THE PREFERRED EMBODIMENTS AND METHOD OF THIS INVENTION

Figure 1:
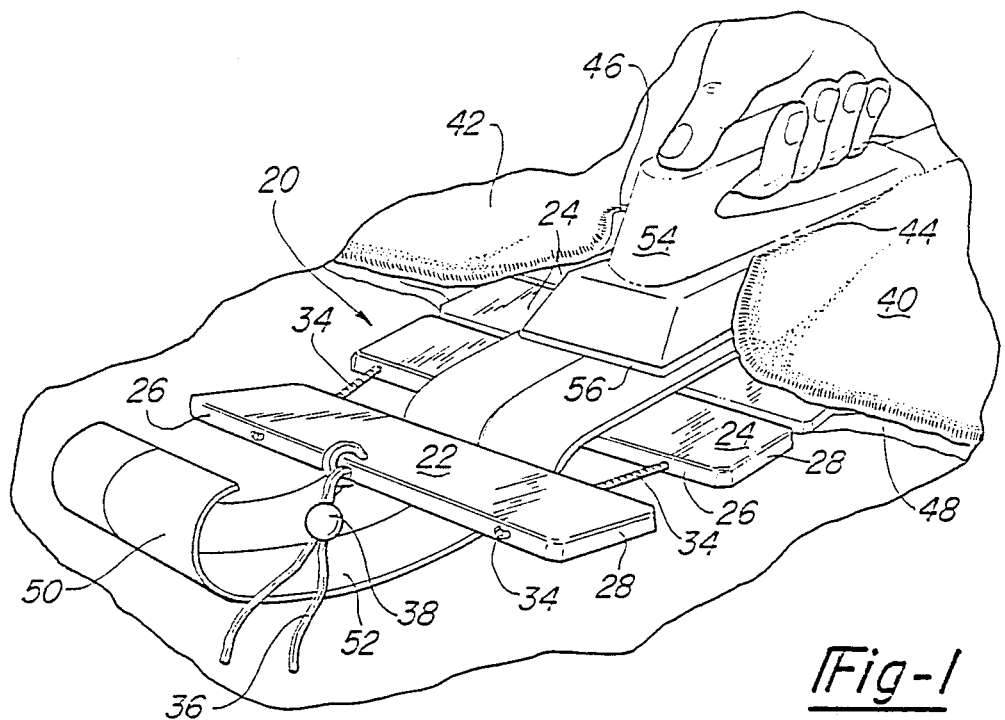
FIG. 1 is a top perspective view illustrating the method of bonding carpet edges using one embodiment of the carpet seaming support of this invention.

The illustrated carpet seaming support 20 includes a plurality of similar slats, including end slats 22 and mid portion slats 24, which are interconnected by filaments or wires, as described hereinbelow. In the disclosed embodiment, the slats 22 and 24 are generally rectangular, including side edges 26 and ends 28, and the slats are arranged in generally side-to-side relation. The slats are preferably relatively thin, having a thickness of about one-eighth inch. Further, as described more fully hereinbelow, the slats are preferably formed of a relatively strong material having a relatively low coefficient of friction and thermal conductivity. A material which meets all of these requirements is a phenolic resin and paper laminate, NEMA Grade XX, available from various commercial sources. It will be understood, however, that other materials including thermoset resins, wood and other materials may also be utilized.

Figure 2:
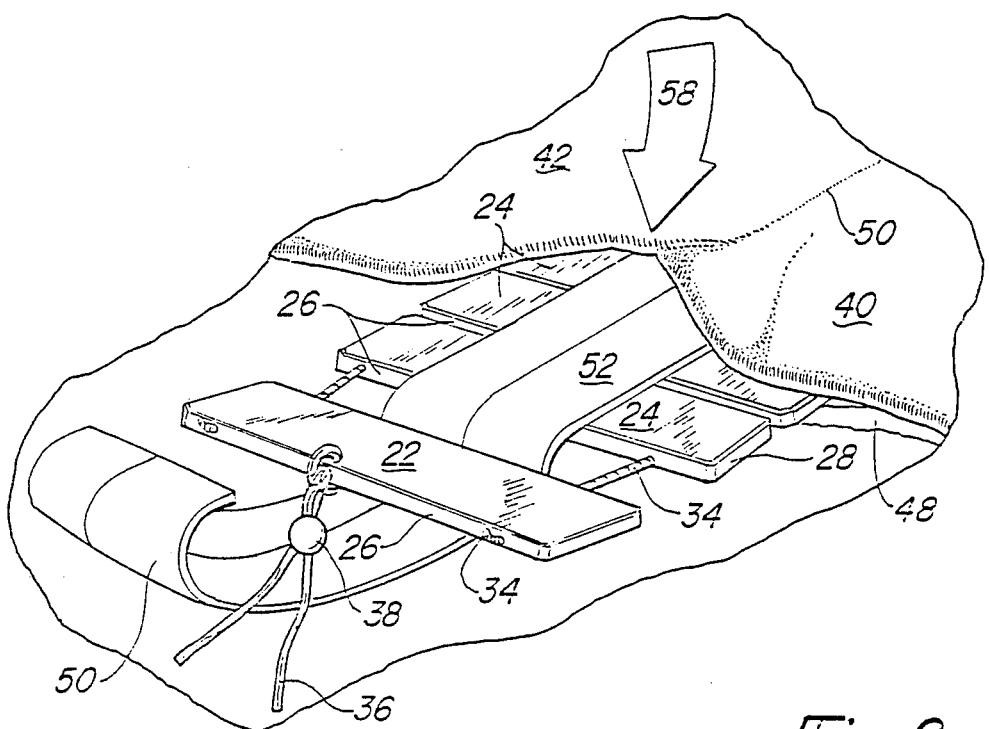
FIG. 2 illustrates a further step in the method of bonding carpet edges wherein pressure is applied to the carpet.

As best shown in FIG. 5, the mid portion slats 24 preferably include spaced apertures 30 through the side edges 26 of the slats for receipt of the filaments, as described below. The apertures may be formed with a conventional drill and extend through the slats. As shown in FIG. 4, the disclosed embodiment of the end slats 22 include a plurality of apertures 32 through the side edges 26 for affixing the filaments to the end slats. In the disclosed embodiment the slats are interconnected in side-to-side relation by a pair of flexible filaments 34 which are received through the apertures 30 and 32, as now described. As best shown in FIGS. 1, 2 and 6, the filaments 34 are received through the apertures 30 in the mid portion slats 24 and the filaments are affixed to the end slats 22 by lacing the filaments through the closely spaced apertures 32. The filaments 34 must be strong enough to avoid breaking under repeated use of the carpet seaming support, including folding or coiling of the seaming support, as described below. A material which meets these requirements is a braided wire, such as a braided stainless steel wire, which provides flexure strength and which is flexible enough to withstand repeated use, without breaking. Further, a braided wire will be permanently retained to the end slats 22 by lacing the braided wire through the bores 32, as described above, without requiring a further fastening means. It will be understood, however, that other materials may be utilized for the filaments 34, including linear polypropylene, various metal wires, etc. Further, the filaments 34 may be attached to the end slats 22 by any suitable means, including various fasteners. The disclosed embodiment of the carpet seaming support also includes a pull string 36 attached to one of the end slats 22 and preferably including a bead 38, which may be a conventional macrame bead.

Having described the general construction of the carpet seaming support 20, the preferred method of bonding carpet sections will now be described, including a description of further features of the carpet seaming support. Referring initially to FIG. 1, the carpet sections 40 and 42 to be joined are arranged with the carpet edges 44 and 46, respectively, in parallel abutting relation. As described above, the carpet sections may be joined in place on a conventional carpet pad 48 because the method of this invention avoids damage to the carpet pad. The carpet seaming support 20 is then located beneath and between the carpet edges 44 and 46 in parallel relation to the seam 50 (see FIG. 2) to be formed. As shown in FIG. 1, the mid portion slats 24 are arranged on the filaments 34 in side-to-side abutting relation, providing a relatively smooth continuous surface for the bonding tape 50. As shown in FIG. 1 and 2, the bonding tape is positioned over the mid portion slats 24 and preferably laced beneath the end slat 22, which assists in retaining the position of the bonding tape during ironing. The bonding tape 50 includes a thermoplastic adhesive 52 on the top surface of the bonding tape and the bonding tape extends generally parallel to the seam 50 beneath the opposed edges 44 and 46 of the carpet sections 40 and 42, respectively.

In the preferred embodiment of the carpet seaming support 20, the mid portion slats 24 may be moved on the filaments 34 and the end slats 22 are spaced a distance sufficient to permit movement of the mid portion slats. As will be understood, the apertures 30 in the mid portion slats may have a greater diameter than the outside diameter of the filaments 34, permitting the mid portion slats to be moved easily on the filaments. The apertures 30 and 32 may be easily formed in the slats by drilling. One end slat 22 may then be spaced from the mid portion slats 24, as shown in FIGS. 1 and 2, to receive the bonding tape 50. Further, the assembly may then be rolled or coiled for storage, as described below.

The heat bonding tape 50 is then heated to heat and soften the thermoplastic adhesive 52 to the bonding temperature of the adhesive. The heat bonding tape 50 may be heated by conventional hot melt carpet seaming iron 54, as shown in FIG. 1. Conventional carpet seaming irons include an electric resistance element which heats the platen 56 to a temperature of about 350° to 500° F. The platen 56 is slowly moved across the thermoplastic adhesive 52 of the seaming tape 50, softening and melting the thermoplastic adhesive. As will be understood, heat bonding tapes and carpet seaming irons are available commercially and the method of this invention is not limited to a particular type of seaming iron or bonding tape.

When the bonding tape 50 has reached the desired bonding temperature, the side edges of the carpet sections overlying the bonding tape are firmly pressed against the carpet seaming support 20 as shown by arrow 58 in FIG. 2. As will now be understood from FIGS. 1 and 2, the carpet seaming support 20 prevents scorching or melting of the carpet pad 48 while localizing the heat generated by the platen 56 of iron 54 to the thermoplastic adhesive 52. Further, as shown in FIG. 2, the edges of the carpet sections may be firmly pressed against the carpet support, without spreading the edges, and forming an essentially invisible seam 50. As described above, the carpet edges will otherwise spread as the carpet is pressed against the soft carpet pad, forming a poor seam.

The carpet seaming support may then be removed from beneath the seamed carpet. As shown in FIG. 3, the carpet seaming support 20 of this invention may be easily removed from a seam which extends to a vertical wall 60 without disturbing the seam 50. The carpet seaming support may be removed by pulling on the drawstring 36, as shown by arrow 62. As the carpet seaming support is pulled from beneath the seamed carpet sections 40 and 42, the slats 22 and 24 each bend relative to the plain of the carpet sections, about filaments 34, permitting removal of the carpet seaming support without disturbing the seam 50. As will be understood, a rigid carpet seaming support could not be removed in this manner without raising the edge of the carpet and possibly damaging the seam at least until the adhesive is cooled and fully set. The seaming support of this invention may be removed almost immediately following seaming, which would not be possible with a rigid seaming support. Finally, the flexible seaming support 20 of this invention may be rolled and coiled for storage, as shown in FIG. 7, wherein the drawstring 36 is used to tie the coiled seaming support. As will be understood, the slats 22 and 24 bend reltive to the adjacent slat around the flexible filaments, permitting the slats to be generally evenly spaced on the filaments and coiled, as shown in FIG. 7.

Various modifications to the carpet seaming support and method of this invention may be made within the purview of the appended claims. In the disclosed embodiment, the slats 22 and 24 are beveled at the edges and corners to avoid snagging of the slats on the carpet and assist coiling. The term slats is used herein to define a relatively thin generally rectangular narrow strip, however, the slats may be of various shapes, including configured shapes, provided the slats may be positioned in side-to-side abutting relation to form a relatively smooth continuous surface for bonding, as described above. Further, a pull string 36 is not necessary, but provides a means of removing the carpet seaming support following installation. The bead 38 provides a means of locating the carpet seaming support where the carpet section extend over the end slat 22. In the disclosed embodiment, the pull string 36 is attached to the end slat 22 by inserting the drawstring through an aperture in the end slat and knotting the string, as shown, however, various other means of attachment may also be used. Finally, the carpet will normally extend to the end slat 22 during bonding. The slats have been extended from beneath the carpet sections in FIGS. 1 and 2 to illustrate the preferred embodiment of the carpet seaming support 20. Having described the preferred embodiments and method of this invention, I now claim the invention as set forth below.

I claim:

1. A method of permanently bonding opposed edges of carpet sections comprising the following steps:
   (a) locating the carpet sections to be joined with the carpet edges in generally parallel abutting relation;
   (b) locating a carpet seaming support beneath and between said carpet edges to be bonded, said carpet seaming support having a plurality of flat slats slidably connected on a flexible filament, said method including arranging said slats in side-to-side abutting relation forming a flat continuous supporting surface beneath and between said carpet sections;
   (c) positioning a heat bonding tape over said carpet seaming support, said tape including side portions having thermoplastic adhesive extending beneath said carpet sections to be joined;
   (d) applying heat to said heat bonding tape heating and softening said thermoplastic adhesive to the bonding temperature of said adhesive;
   (e) applying pressure to the portions of said carpet sections adjacent said opposed carpet edges bonding said carpet portions and edges to said heat bonding tape; and
   (f) removing said carpet seaming support.

2. The method of permanently bonding the opposed edges of carpet sections defined in claim 1, wherein said opposed edges of carpet sections extend to a vertical wall, said method including removing said carpet seaming support by pulling one of said slats and simultaneously folding said carpet seaming support about an axis generally parallel to the juncture of the vertical wall and the floor surface as the flexible carpet seaming support is removed from beneath the bonded carpet sections.

3. The method of permanently bonding opposed edges of carpet sections defined in claim 1, characterized in that said carpet seaming support includes a plurality of mid portion slats slidably retained on said flexible filament and end slats on opposed sides of said plurality of mid portion slats affixed to said flexible filament, the said method including arranging said mid portion slats in side-to-side abutting relation spaced from one of said end slats and receiving said heat bonding tape over said mid portion slats and beneath said one end slat prior to applying heat to said heat bonding tape.

* * * * *